United States Patent
Yamagishi et al.

(10) Patent No.: US 11,972,084 B2
(45) Date of Patent: Apr. 30, 2024

(54) TOUCH PANEL SYSTEM CAPABLE OF DETERMINING A PRESSING FORCE AND DISPLAY DEVICE WITH THE TOUCH PANEL SYSTEM

(71) Applicant: Sharp Display Technology Corporation, Kameyama (JP)

(72) Inventors: Shinji Yamagishi, Kameyama (JP); Takenori Maruyama, Kameyama (JP); Kazutoshi Kida, Kameyama (JP); Takuma Yamamoto, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/079,776

(22) Filed: Dec. 12, 2022

(65) Prior Publication Data
US 2023/0205386 A1  Jun. 29, 2023

(30) Foreign Application Priority Data
Dec. 27, 2021 (JP) ................................ 2021-213108

(51) Int. Cl.
*G06F 3/044* (2006.01)

(52) U.S. Cl.
CPC .......... *G06F 3/0448* (2019.05); *G06F 3/0443* (2019.05); *G06F 2203/04105* (2013.01); *G06F 2203/04107* (2013.01)

(58) Field of Classification Search
CPC ......... G06F 2203/04105; G06F 3/0412; G06F 3/041662; G06F 3/0446; G06F 3/0447
See application file for complete search history.

(56) References Cited

U.S. PATENT DOCUMENTS

| | | | | |
|---|---|---|---|---|
| 2015/0109231 A1* | 4/2015 | Shirai | ................... | G06F 3/0446 345/173 |
| 2015/0212633 A1* | 7/2015 | Yamagishi | .............. | G06F 3/045 345/174 |
| 2015/0355771 A1* | 12/2015 | Watazu | ................. | G06F 3/0445 345/174 |

(Continued)

FOREIGN PATENT DOCUMENTS

| JP | 2014-179035 A | 9/2014 |
|---|---|---|
| JP | 2021-128511 A | 9/2021 |

*Primary Examiner* — Chun-Nan Lin
(74) *Attorney, Agent, or Firm* — ScienBiziP, P.C.

(57) ABSTRACT

A touch panel system includes a touch panel, a cover member overlapping the touch panel, and a controller. The controller includes a position detection unit configured to detect a position of a pointer, based on a signal value obtained from a position detection electrode, an amplification processing unit configured to perform amplification processing on at least one signal value in a pressing force detection range corresponding to the position of the pointer detected by the position detection unit among signal values obtained from a pressing force detection electrode, and a pressing force detection unit configured to calculate magnitude of a pressing force generated by the pointer, based on a signal value after the amplification processing being a signal value in the pressing force detection range including a signal value obtained by amplification by the amplification processing unit.

6 Claims, 16 Drawing Sheets

(56) References Cited

U.S. PATENT DOCUMENTS

| | | | |
|---|---|---|---|
| 2016/0162076 A1* | 6/2016 | Fukagawa | C08G 18/8009 |
| | | | 525/289 |
| 2016/0259482 A1* | 9/2016 | Ogikubo | G06F 3/0446 |
| 2016/0357331 A1* | 12/2016 | Kano | G06F 3/0412 |
| 2017/0115780 A1* | 4/2017 | Ogikubo | B32B 27/308 |
| 2018/0239479 A1* | 8/2018 | Suzuki | G06F 3/0442 |
| 2019/0204958 A1* | 7/2019 | Oh | G06F 3/0447 |
| 2020/0241681 A1* | 7/2020 | Chen | G06F 3/0445 |
| 2021/0255737 A1* | 8/2021 | Kida | G06F 3/0445 |

\* cited by examiner

| C(-2,-2) =D(-2,-2) | C(-1,-2) =D(-1,-2) | C(0,-2) =D(0,-2) | C(1,-2) =D(1,-2) | C(2,-2) =D(2,-2) |
|---|---|---|---|---|
| C(-2,-1) =C(-2,-2)+D(-2,-1) | C(-1,-1) =C(-1,-2)+D(-1,-1) | C(0,-1) =C(0,-2)+D(0,-1) | C(1,-1) =C(1,-2)+D(1,-1) | C(2,-1) =C(2,-1)+D(2,-1) |
| C(-2,0) =C(-2,-1)+D(-2,0) | C(-1,0) =C(-1,-1)+D(-1,0) | C(0,0) =C(0,-1)+D(0,0) | C(1,0) =C(1,-1)+D(1,0) | C(2,0) =C(2,-1)+D(2,0) |
| C(-2,1) =C(-2,0)+D(-2,1) | C(-1,1) =C(-1,0)+D(-1,1) | C(0,1) =C(0,0)+D(0,1) | C(1,1) =C(1,0)+D(1,1) | C(2,1) =C(2,0)+D(2,1) |
| C(-2,2) =C(-2,1)+D(-2,2) | C(-1,2) =C(-1,1)+D(-1,2) | C(0,2) =C(0,1)+D(0,2) | C(1,2) =C(1,1)+D(1,2) | C(2,2) =C(2,1)+D(2,2) |

TOUCH PANEL SYSTEM CAPABLE OF DETERMINING A PRESSING FORCE AND DISPLAY DEVICE WITH THE TOUCH PANEL SYSTEM

CROSS-REFERENCE TO RELATED APPLICATIONS

This application claims the benefit of priority to Japanese Patent Application Number 2021-213108 filed on Dec. 27, 2021. The entire contents of the above-identified application are hereby incorporated by reference.

BACKGROUND

Technical Field

The disclosure relates to a touch panel system that determines a position of a pointer such as a finger or a touch pen, and the magnitude of a pressing force generated by the pointer, and to a display device provided with the touch panel system.

There have been known an electrostatic capacitance type touch panel and a display device each of which is provided with a pressing force detection electrode and a position detection electrode. Such an electrostatic capacitance type touch panel and such a display device are disclosed in, for example, JP 2021-128511 A.

The electrostatic capacitance type touch panel in JP 2021-128511 A described above includes a drive electrode formed on a first substrate, and a position sense electrode and a pressing force sense electrode that are formed on a second substrate. In this electrostatic capacitance type touch panel, when a pointer is capacitively coupled to the drive electrode and the position sense electrode, electrostatic capacitance between the drive electrode and the position sense electrode decreases, and a signal from the position sense electrode changes. A position of the pointer is detected based on the change in the signal from the position sense electrode. Further, when a distance between the drive electrode and the pressing force sense electrode is reduced in response to the pointer pressing the electrostatic capacitance type touch panel, electrostatic capacitance between the drive electrode and the pressing force sense electrode increases, and a signal from the pressing force sense electrode changes. The magnitude of a pressing force is determined based on the change in the signal from the pressing force sense electrode.

SUMMARY

Here, in the electrostatic capacitance type touch panel described in JP 2021-128511 A described above, a cover member is provided in order to prevent damage to the electrostatic capacitance type touch panel. Thus, the electrostatic capacitance type touch panel is pressed by the pointer via the cover member. Therefore, the electrostatic capacitance type touch panel is less likely to become deformed even when the electrostatic capacitance type touch panel is pressed, and a distance between the drive electrode and the pressing force sense electrode is less likely to change. As a result, there is a problem that a change amount of the electrostatic capacitance between the drive electrode and the pressing force sense electrode decreases, and detection sensitivity of a pressing force decreases.

Thus, the disclosure has been conceived in order to solve the problem described above, and aims to provide a touch panel system and a display device that have improved detection sensitivity of a pressing force even when a cover member is provided.

In order to solve the problem described above, a touch panel system according to a first aspect of the disclosure includes a touch panel including a drive electrode, a position detection electrode, and a pressing force detection electrode; a cover member overlapping the touch panel; and a controller configured to provide a drive signal to the drive electrode and acquire a signal value from each of the position detection electrode and the pressing force detection electrode, wherein the controller includes a position detection unit configured to detect a position of a pointer, based on a signal value obtained from the position detection electrode, an amplification processing unit configured to perform amplification processing on at least one signal value in a pressing force detection range, the signal value corresponding to the position of the pointer detected by the position detection unit, among signal values obtained from the pressing force detection electrode, and a pressing force detection unit configured to calculate magnitude of a pressing force generated by the pointer, based on a signal value after the amplification processing being a signal value in the pressing force detection range including a signal value obtained by amplification by the amplification processing unit.

Further, a display device according to a second aspect includes the touch panel system according to the first aspect; and a display configured to display an image, wherein the touch panel is disposed in a position overlapping the display in a plan view.

According to the configuration described above, even when the cover member is provided, at least one signal value in the pressing force detection range is amplified, and thus detection sensitivity of a pressing force can be improved.

BRIEF DESCRIPTION OF DRAWINGS

The disclosure will be described with reference to the accompanying drawings, wherein like numbers reference like elements.

FIG. 9 is a schematic view (2) illustrating the method for calculating a specific position of the pointer F by the controller 2.

DESCRIPTION OF EMBODIMENTS

Figure 1:
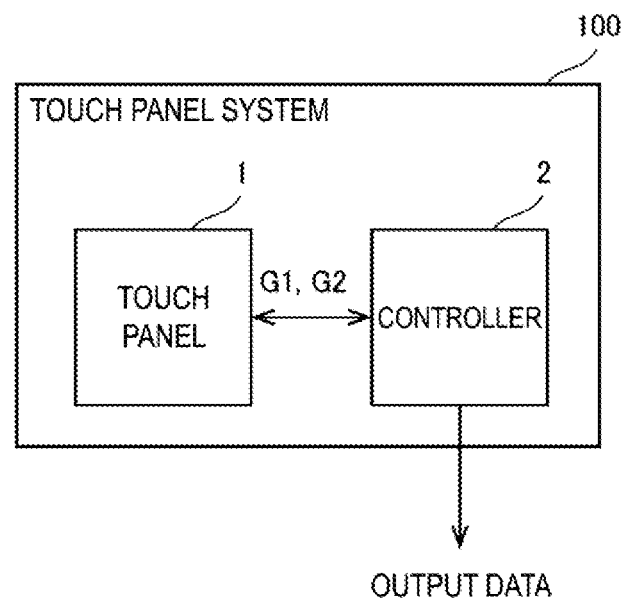
FIG. 1 is a block diagram illustrating a configuration of a touch panel system 100 according to a first embodiment.

Embodiments of the disclosure will be described below with reference to the drawings. Note that the disclosure is not limited to the following embodiments, and appropriate design changes can be made within a scope that satisfies the configuration of the disclosure. Further, in the description below, the same reference signs are used in common among the different drawings for portions having the same or similar functions, and descriptions of repetitions thereof will be omitted. Further, the configurations described in the embodiments and the modified examples may be combined or modified as appropriate within a range that does not depart from the gist of the disclosure. Further, for ease of explanation, in the drawings referenced below, the configuration is simplified or schematically illustrated, or a portion of the components is omitted. Further, dimensional ratios between components illustrated in the drawings are not necessarily indicative of actual dimensional ratios.

First Embodiment

Overall Configuration of Touch Panel System

A configuration of a touch panel system 100 according to a first embodiment will be described. FIG. 1 is a block diagram illustrating the configuration of the touch panel system 100 according to the first embodiment.

As illustrated in FIG. 1, the touch panel system 100 includes a touch panel 1 and a controller 2. The touch panel 1 is configured as an electrostatic capacitance type touch panel and is configured to output a position signal value G1 indicating a position of a pointer and a pressing force signal value G2 indicating a pressing force generated by the pointer. The controller 2 provides a drive signal to the touch panel 1, acquires the position signal value G1 and the pressing force signal value G2 from the touch panel 1, and detects the position of the pointer and the pressing force generated by the pointer based on the position signal value G1 and the pressing force signal value G2. The controller 2 transmits the detection result of the position of the pointer and the pressing force generated by the pointer as output data to a control unit of a display device 101 (see FIG. 2) provided with the touch panel system 100. The output data is used for, for example, controlling an image displayed by the display device 101.

Figure 2:
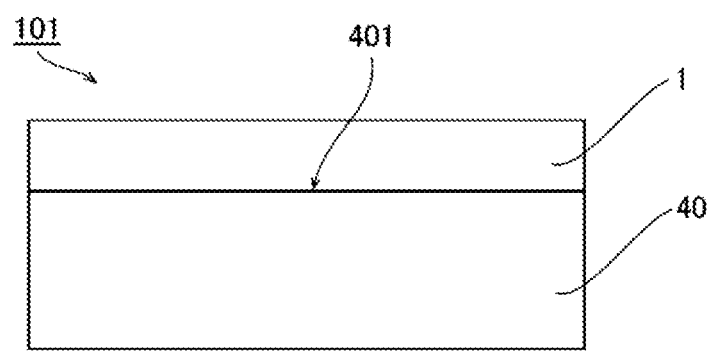
FIG. 2 is a cross-sectional view illustrating a configuration of a display device 101 including the touch panel system 100 according to the first embodiment.

FIG. 2 is a cross-sectional view illustrating a configuration of the display device 101 including the touch panel system 100 according to the first embodiment. As illustrated in FIG. 2, the display device 101 includes the touch panel 1 and a display 40 configured to display an image on a display surface 401. The display 40 is formed of a liquid crystal display or an organic electro luminescence (EL) display, for example. The touch panel 1 is disposed in a position overlapping the display 40 in a plan view.

Configuration of Touch Panel

Figure 3:
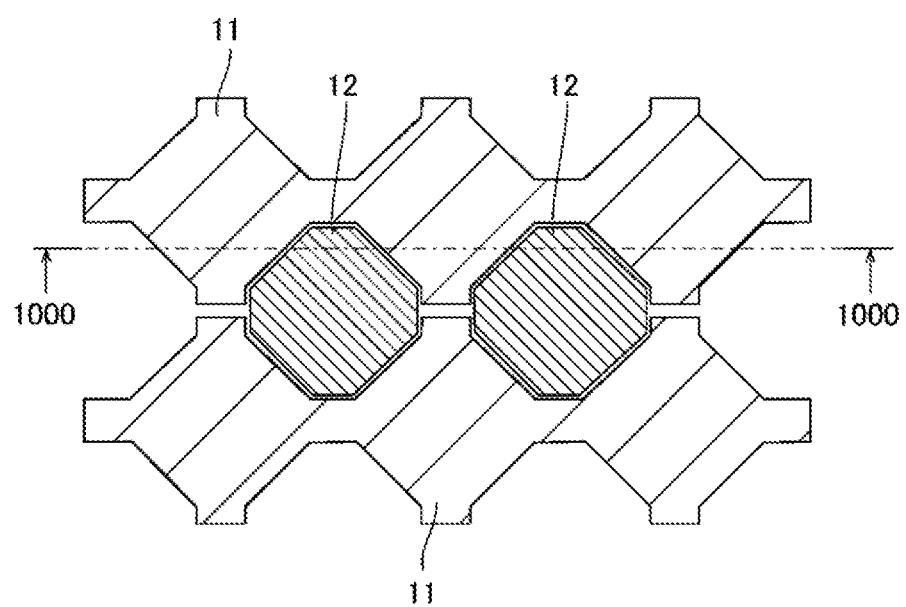
FIG. 3 is a plan view illustrating a configuration of a drive electrode and a floating electrode that are included in a touch panel 1 according to the first embodiment.
Figure 4:
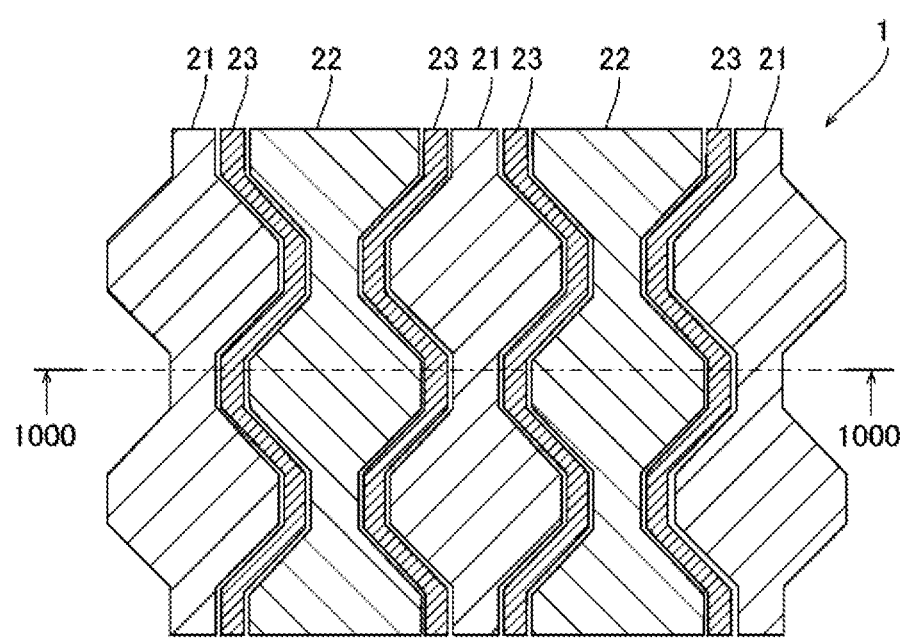
FIG. 4 is a plan view illustrating a configuration of a position detection electrode and a pressing force detection electrode that are included in the touch panel 1 according to the first embodiment.
Figure 5:
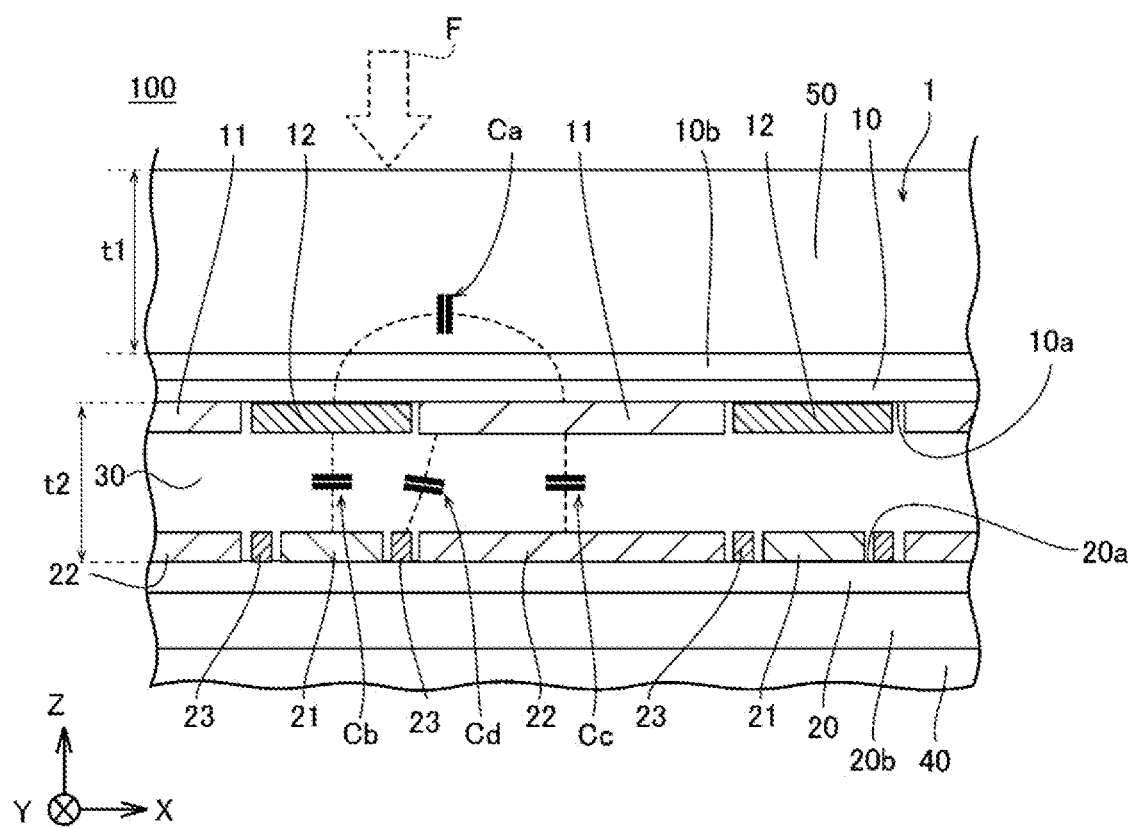
FIG. 5 is a cross-sectional view taken along a line 1000-1000 in FIGS. 3 and 4.

FIGS. 3 and 4 are plan views illustrating configurations of electrodes included in the touch panel 1 according to the first embodiment. FIG. 5 is a cross-sectional view taken along a line 1000-1000 in FIGS. 3 and 4. Note that for the sake of convenience in illustration, the electrodes included in the touch panel 1 are illustrated separately in FIGS. 3 and 4; however, as illustrated in FIG. 5, the electrodes illustrated in FIGS. 3 and 4 are layered.

As illustrated in FIG. 5, the touch panel 1 includes a first substrate 10, a drive electrode 11, a floating electrode 12, a second substrate 20, a position detection electrode 21, a pressing force detection electrode 22, a shield electrode 23, and a dielectric layer 30. For example, the first substrate 10 and the second substrate 20 are formed of a transparent material such as a glass polyethylene terephthalate (PET) film. Further, the drive electrode 11, the floating electrode 12, the position detection electrode 21, the pressing force detection electrode 22, and the shield electrode 23 are formed of a conductive transparent material such as indium tin oxide (ITO). Further, the dielectric layer 30 is a pressure-sensitive member and formed of an elastic transparent material such as a polymeric material, an optical clear adhesive (OCA), or an optical clear resin (OCR). Then, the touch panel 1 includes a cover member 50. The cover member 50 is formed of, for example, a glass material. The cover member 50 is disposed on a touch surface side (opposite side to the dielectric layer 30) of the first substrate 10 with an OCA layer 10b therebetween. A surface of the cover member 50 is touched and pressed by the pointer. The OCA layer 10b bonds the cover member 50 and the first substrate 10. Further, an OCA layer 20b and the display 40 are disposed on an opposite side to the dielectric layer 30 of the second substrate 20. Further, a thickness t1 of the cover member 50 is greater than a thickness t2 of the dielectric layer 30, for example.

The first substrate 10 and the second substrate 20 are disposed such that a first surface 10a of the first substrate 10 and a second surface 20a of the second substrate 20 face each other. The drive electrode 11 is an electrode to which a drive signal is provided and is formed on the first surface 10a. The floating electrode 12 is in a floating state and is formed on the first surface 10a.

The position detection electrode 21 is an electrode for detecting the position of the pointer and is formed on the second surface 20a. The pressing force detection electrode 22 is an electrode for determining the magnitude of the pressing force generated by the pointer and is formed on the second surface 20a. The shield electrode 23 is provided with a potential equal to the ground potential or a potential provided to the position detection electrode 21 or the pressing force detection electrode 22, or is in a floating state, and is formed on the second surface 20a.

As illustrated in FIG. 3, the drive electrode 11 has a shape (diamond pattern) in which a plurality of rhombus-shaped electrodes are connected to each other in diagonal directions thereof. Further, the floating electrode 12 is formed of a plurality of rhombus-shaped electrodes that are not connected to each other.

As illustrated in FIG. 4, the position detection electrode 21 has a diamond pattern in which a plurality of rhombus-shaped electrodes are connected to each other, like the drive electrode 11. Further, the pressing force detection electrode 22 also has a diamond pattern in which a plurality of rhombus-shaped electrodes are connected to each other. A connecting direction of the rhombus-shaped electrodes in the position detection electrode 21 and a connecting direction of the rhombus-shaped electrodes in the pressing force detection electrode 22 are parallel to each other, and the position detection electrode 21 and the pressing force detection electrode 22 are alternately disposed with respect to a direction perpendicular to the connecting directions. The connecting direction of the rhombus-shaped electrodes in each of the position detection electrode 21 and the pressing force detection electrode 22 is perpendicular to the connecting direction of the rhombus-shaped electrodes in the drive electrode 11.

In addition, as illustrated in FIGS. 4 and 5, the shield electrode 23 is disposed between the position detection electrode 21 and the pressing force detection electrode 22. For example, the shield electrode 23 is disposed between the position detection electrode 21 and the pressing force detection electrode 22 to separate these electrodes from each other.

When the second substrate 20 is viewed from the first substrate 10 in a plan view (hereinafter, simply referred to as a "plan view"), the drive electrode 11 covers at least a part of the pressing force detection electrode 22. Note that in the touch panel 1 illustrated in FIGS. 2 to 4, one rhombus-shaped electrode constituting the drive electrode 11 includes one rhombus-shaped electrode constituting the pressing force detection electrode 22 in a plan view. Similarly, one rhombus-shaped electrode constituting the floating electrode 12 includes one rhombus-shaped electrode constituting the position detection electrode 21 in a plan view.

Next, operations of the touch panel 1 will be described with reference to drawings. FIG. 5 illustrates electric force lines corresponding to capacitive coupling occurring between a pointer F and various electrodes and capacitive coupling occurring between the various electrodes by dashed lines. As illustrated in FIG. 5, when the pointer F comes into contact with the surface of the first substrate 10 on a side opposite to the first surface 10*a*, the drive electrode 11 and the floating electrode 12 are capacitively coupled to each other (capacitance Ca is formed). At this time, the floating electrode 12 and the position detection electrode 21 are capacitively coupled to each other (capacitance Cb is formed), and thus the drive electrode 11 and the position detection electrode 21 are capacitively coupled to each other via the floating electrode 12. Therefore, electrostatic capacitance between the drive electrode 11 and the position detection electrode 21 is decreased via the pointer F, and a signal detected at the position detection electrode 21 changes, whereby the position of the pointer F is detected.

As illustrated in FIG. 5, the drive electrode 11 and the pressing force detection electrode 22 are capacitively coupled to each other (Cc is formed). Here, when the first substrate 10 is pressed by the pointer F, a distance between the drive electrode 11 and the pressing force detection electrode 22 decreases because the dielectric layer 30 is a material having elasticity. In this way, the electrostatic capacitance Cc between both the electrodes 11 and 22 increases, and a signal detected at the pressing force detection electrode 22 changes, and thus the magnitude of a pressing force is determined.

When the first substrate 10 is pressed by the pointer F, the distance between the drive electrode 11 and the position detection electrode 21 decreases. However, since the drive electrode 11 is closer to the shield electrode 23 than to the position detection electrode 21, the drive electrode 11 is likely to be capacitively coupled to the shield electrode 23 (capacitance Cd is formed). Thus, electrostatic capacitance between the drive electrode 11 and the position detection electrode 21 is less likely to increase, and the decrease in electrostatic capacitance between the drive electrode 11 and the position detection electrode 21 due to the pointer F is less likely to be canceled out.

In addition, since the pointer F is closer to the shield electrode 23 than to the pressing force detection electrode 22 on a path from the pointer F to the pressing force detection electrode 22, the pointer F is likely to be capacitively coupled to the shield electrode 23. Thus, the pointer F is inhibited from being capacitively coupled to each of the drive electrode 11 and the pressing force detection electrode 22, and this inhibits fluctuation in electrostatic capacitance between both the electrodes.

Configuration of Controller

Figure 6:
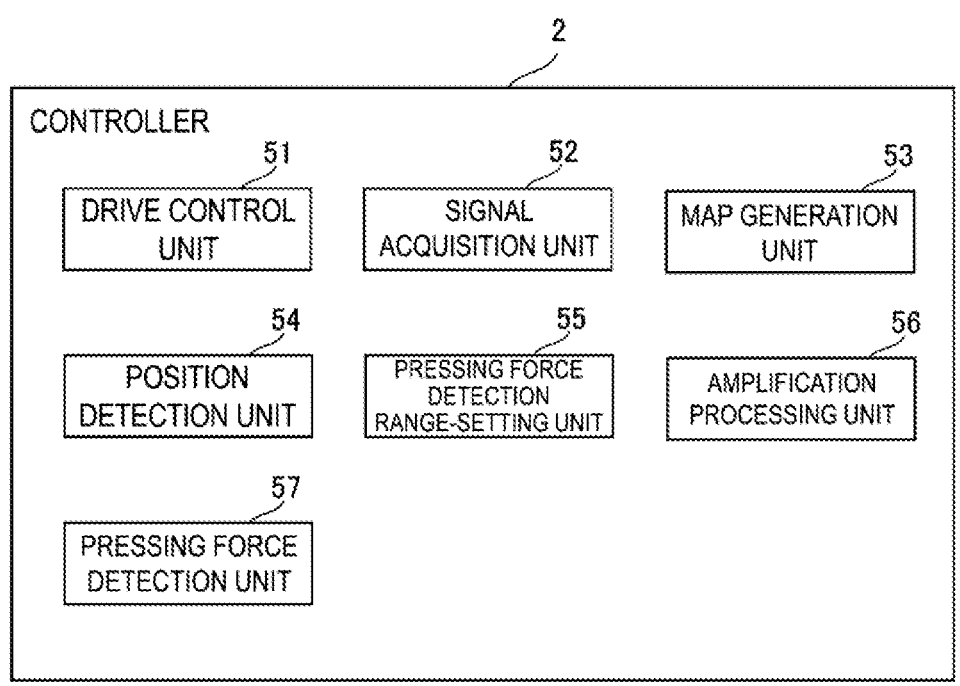
FIG. 6 is a functional block diagram of a controller 2.

Next, a configuration of the controller 2 and a method for determining a position of the pointer F and the magnitude of a pressing force by the controller 2 will be described. FIG. 6 is a functional block diagram of the controller 2. The controller 2 includes a processor (control circuit) that performs control processing of the touch panel system 100 by executing a program. As illustrated in FIG. 6, the controller 2 functions as a drive control unit 51, a signal acquisition unit 52, a map generation unit 53, a position detection unit 54, a pressing force detection range-setting unit 55, an amplification processing unit 56, and a pressing force detection unit 57. Note that FIG. 6 illustrates the controller 2 as a functional block, but the controller 2 may be formed of separate pieces of hardware (control circuits) for respective functions.

The drive control unit 51 transmits a drive signal to the touch panel 1, for each unit time (one frame period). For example, the drive control unit 51 sequentially transmits the drive signal to the drive electrodes 11 of the touch panel 1. "One frame period" means a period during which the drive signal is transmitted to all of the drive electrodes 11 of the touch panel 1 (a period of one cycle). The signal acquisition unit 52 acquires a signal from each of the position detection electrode 21 and the pressing force detection electrode 22 when the drive signal is transmitted from the drive control unit 51.

Figure 7:
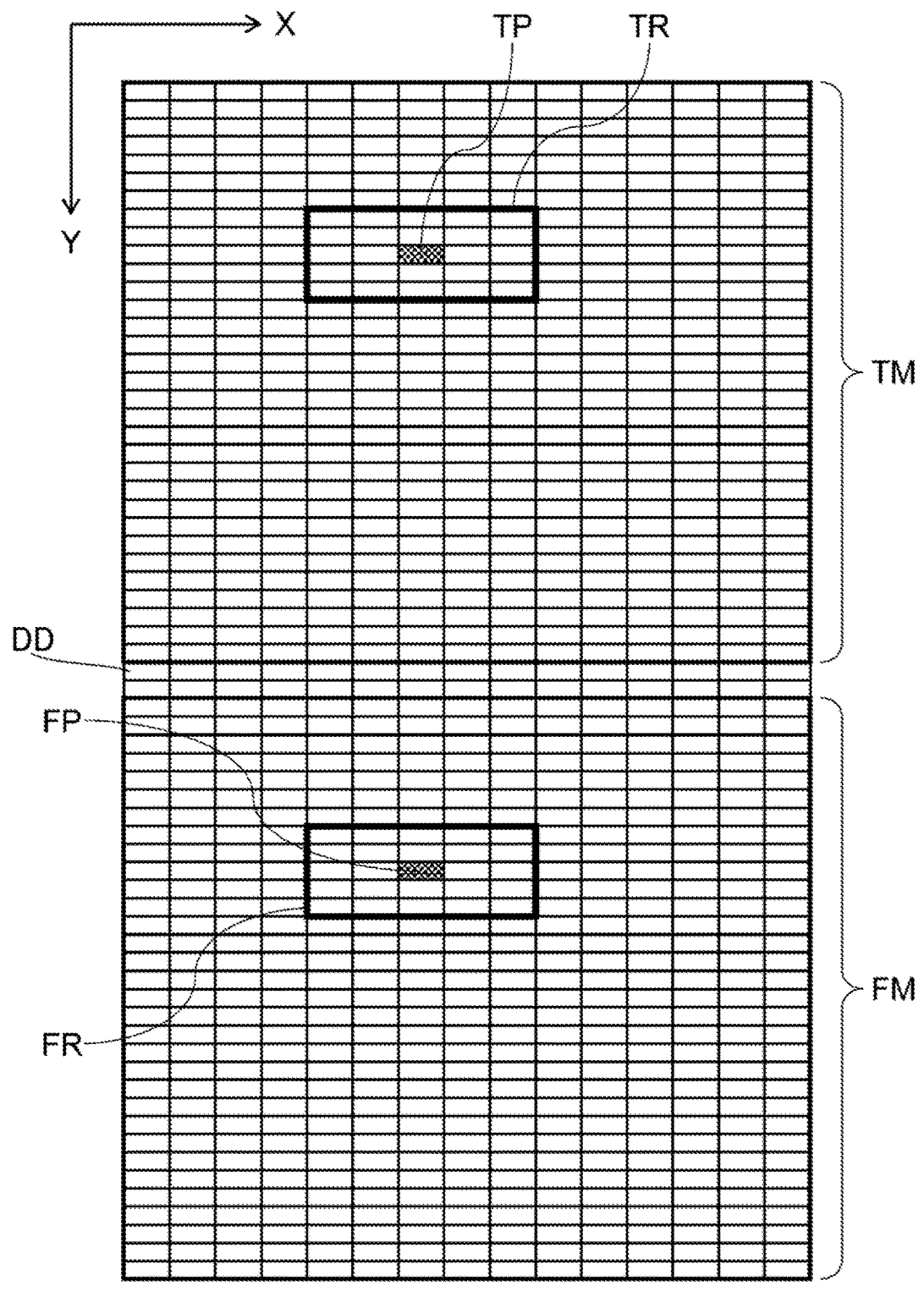
FIG. 7 is a diagram illustrating an example of a data map M.

FIG. 7 is a diagram illustrating an example of a data map M. The map generation unit 53 generates the data map M by using a position signal value G1 and a pressing force signal value G2 that have been acquired. The data map M illustrated in FIG. 7 is data acquired when 15 drive electrodes 11, 32 position detection electrodes 21, and 32 pressing force detection electrodes 22 are provided. The data map M is data including elements represented by two-dimensional coordinates of (X, Y). An X direction is a direction in which the drive electrodes 11 are aligned, and a Y direction is a direction in which the position detection electrodes 21 and the pressing force detection electrodes 22 are aligned. Note that, in the following, a direction in which the value of Y increases will be represented as a downward direction, and a direction in which the value of Y decreases will be represented as an upward direction.

The data map M is data in which the position signal values G1 and the pressing force signal values G2 are arranged in different regions of one two-dimensional coordinate system and combined. In the data map M illustrated in FIG. 7, a position detection map TM in which the position signal values G1 acquired from the position detection electrodes 21 are aligned and a pressing force detection map FM in which the pressing force signal values G2 acquired from the pressing force detection electrodes 22 are aligned are arranged in different regions such that the position detection map TM is on an upper side and the pressing force detection map FM is on a lower side, with two rows of dummies DD interposed between the maps TM and FM at a central portion in the Y direction. As illustrated in FIG. 4, the position detection electrodes 21 and the pressing force detection electrodes 22 are alternately aligned; however, the position signal values G1 and the pressing force signal values G2 are arranged separated from each other. In the data map M illustrated in FIG. 7, the position signal value G1 corresponding to an electrostatic capacitance formed by the X-th drive electrode 11 and the Y-th position detection electrode 21, with one corner on the touch panel 1 serving as the origin, is an element of (X, Y). The pressing force signal value G2 corresponding to an electrostatic capacitance formed by the X-th drive electrode 11 and the Y-th pressing force detection electrode 22 is an element of (X, Y+34).

Hereinafter, description will be given with reference to a case where, in the data map M, when the surface of the touch panel 1 is pressed by the pointer F, the position signal value G1 of an element corresponding to the vicinity of the center of a contact portion of the pointer F in the position detection map TM increases to a positive value, and the pressing force signal value G2 of the element corresponding to the vicinity of the center of the contact portion of the pointer F in the pressing force detection map FM also increases to a positive value.

As illustrated in FIG. 7, the position detection unit 54 detects a position TP of the pointer F from within the position detection map TM of the data map M. For example, the position detection unit 54 detects, as the position TP of the pointer F, an element of which the position signal value G1 is equal to or greater than a position detection threshold value G1$t$ and is a maximum in the position detection map TM among the elements in the position detection map TM. Note that, when there is no element of which the position signal value G1 is equal to or greater than the position detection threshold value G1$t$ in the position detection map TM, the position detection unit 54 determines that there is no pointer F that is in contact with the touch panel 1. Note that the position detection unit 54 may be configured to detect, as the position TP of the pointer F, an element of which the position signal value G1 is the maximum in the position detection map TM when the position signal value G1 is equal to or greater than the position detection threshold value G1$t$ continuously for a plurality of frame periods (for example, three frame periods).

Figure 8:
FIG. 8 is a schematic view (1) illustrating a method for calculating a specific position of a pointer F by the controller 2.

Further, the position detection unit 54 calculates a specific position of the pointer F. A method for calculating a specific position by the position detection unit 54 will be described with reference to FIGS. 8 and 9. FIGS. 8 and 9 are schematic views illustrating the method for calculating a specific position of the pointer F by the controller 2. Note that, in FIGS. 8 and 9, the position TP of the pointer F is indicated as (0, 0).

As illustrated in FIGS. 8 and 9, the position detection unit 54 sets a position detection range TR having a size of A×B such that the position detection range TR includes the position TP of the pointer F. FIGS. 8 and 9 illustrate a case where a region having a size of 5×5 is set, as the position detection range TR, with the position TP of the pointer F serving as the center. Note that, in a case where the position detection range TR having a size of 5×5 is set with the position TP of the pointer F as a center and a portion of the position detection range TR protrudes from the position detection map TM, the position detection range TR may be set smaller than a size of 5×5 by deleting the protruding portion, or may be set to have a size of 5×5 but fit within the position detection map TM by shifting the position TP of the pointer F from the center.

The position detection unit 54 calculates a signal value C(X, Y) by cumulatively adding a signal value D(X, Y) in the position detection range TR in the Y direction. Specifically, the position detection unit 54 calculates the signal value C(X, Y) by C(X, Y)=C(X, Y−1)+D(X, Y). However, in the calculation of the signal value C(X, Y), the position detection unit 54 sets C(X, Y)=D(X, Y) for an element at an upper end of the position detection range TR for which C(X, Y−1) cannot be calculated. Note that the disclosure is not limited to the example of cumulatively adding the signal value D(X, Y) in the Y direction. For example, the position detection unit 54 may directly calculate the value of the signal value C(X, Y) without cumulatively adding the signal value D(X, Y) in the position detection range TR in the Y direction. In this case, the value of the signal value C (X, Y) may be directly used without using the calculation method (cumulative addition). In other words, C(X, Y)=D(X, Y) may be set in the entire region.

The position detection unit 54 calculates a position of the center of gravity of the calculated signal value C(X, Y), based on the magnitude of the signal value and the coordinates (X, Y), and sets the position of the center of gravity as the specific position of the pointer F. When the specific position of the pointer F is calculated in this way, the position of the pointer F which is present between the coordinates (X, Y) can be detected, and thus a resolution for detecting the position of the pointer F can be improved.

The pressing force detection range-setting unit 55 sets a pressing force detection range FR, based on the pressing force signal value G2. Specifically, as illustrated in FIG. 7, the pressing force detection range-setting unit 55 sets the pressing force detection range FR in the pressing force detection map FM of the data map M. Then, the pressing force detection range-setting unit 55 sets the pressing force detection range FR having a size of C×D such that the pressing force detection range FR includes the position TP of the pointer F. FIG. 7 illustrates a case where a region having a size of 5×5 is set as the pressing force detection range FR centering on the position FP in the pressing force detection map FM corresponding to the position TP of the pointer F. In the case of the example illustrated in FIG. 7, an X coordinate of the position FP is the same as that of the position TP, and a Y coordinate of the position FP is a value obtained by adding 34 to the Y coordinate of the position TP. Note that, in a case where the pressing force detection range FR having a size of 5×5 is set with the position FP as a center and a portion of the pressing force detection range FR protrudes from the pressing force detection map FM, the pressing force detection range FR may be set smaller than a size of 5×5 by deleting the protruding portion, or may be set to have a size of 5×5 but fit within the pressing force detection map FM without centering on the position FP.

Figure 10:
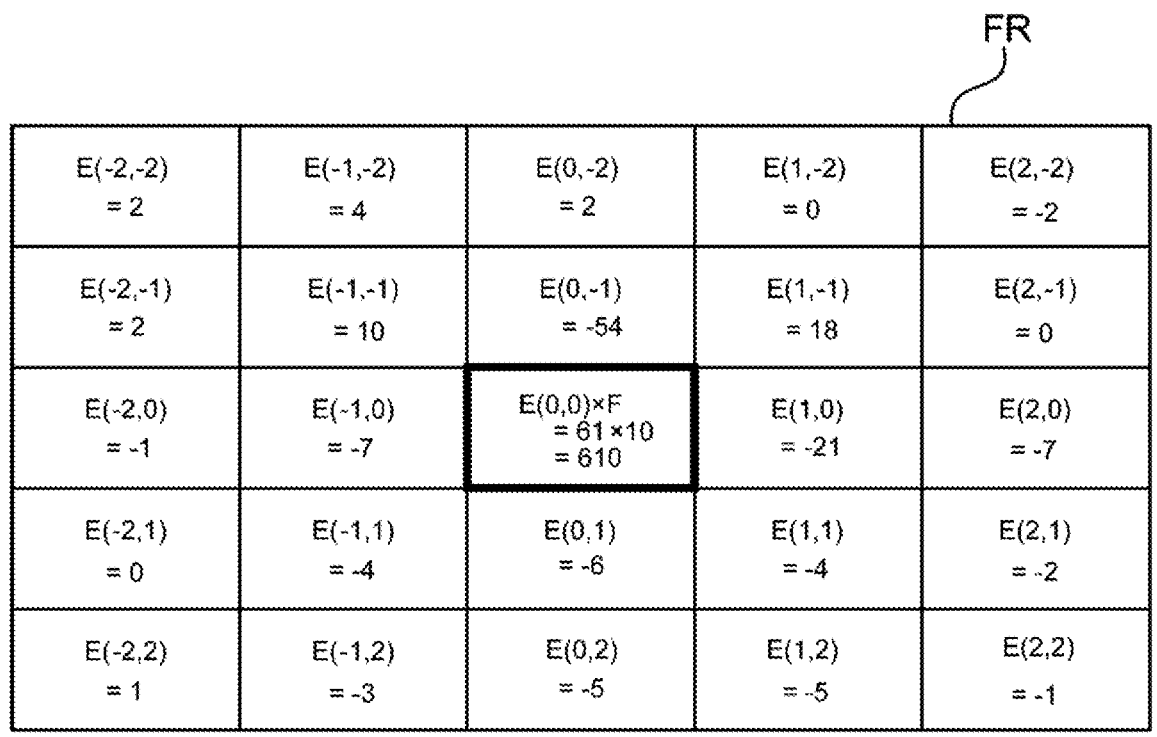
FIG. 10 is a diagram illustrating an example of a value of a pressing force detection map FM after amplification processing according to the first embodiment.

FIG. 10 is a diagram illustrating an example of a value of the pressing force detection map FM after amplification processing according to the first embodiment. The amplification processing unit 56 performs the amplification processing on at least one pressing force signal value G2 in the pressing force detection range FR. In the first embodiment, the amplification processing unit 56 performs the amplification processing on a maximum value among the pressing force signal values G2 in the pressing force detection range FR. Note that, in the first embodiment, the "maximum value" means a value having the greatest absolute value of the signal value. In a case of the example illustrated in FIG. 10, E(0, 0) in the pressing force detection range FR is a maximum value "61", and the amplification processing unit 56 changes the maximum value "61" to "610", which is a value F times (for example, 10 times) the maximum value.

The pressing force detection unit 57 calculates a pressing force value Z indicating the magnitude of a pressing force generated by the pointer F, based on the pressing force signal value G2 in the pressing force detection range FR after the amplification processing. For example, the pressing force detection unit 57 calculates the pressing force value Z by summing absolute values of the pressing force signal values G2 in the pressing force detection range FR after the amplification processing. In a case of the example illustrated in FIG. 10, the pressing force value Z is 2+4+2+0+2+2+10+54+18+0+1+7+610+21+7+0+4+6+4+2+1+3+5+5+1=771. Then, the pressing force detection unit 57 outputs the coordinates of the position FP and the pressing force value Z as output data.

As described above, in the touch panel system 100, the controller 2 detects the position TP of the pointer F, and also amplifies the signal value in the pressing force detection range FR corresponding to the position TP (position FP) to calculate the pressing force value Z based on the amplified value. Therefore, even when the cover member 50 is provided, the touch panel system 100 can simultaneously determine a position of the pointer F and the magnitude of a pressing force and can have improved detection sensitivity of the pressing force.

Control Processing According to First Embodiment

Figure 11:
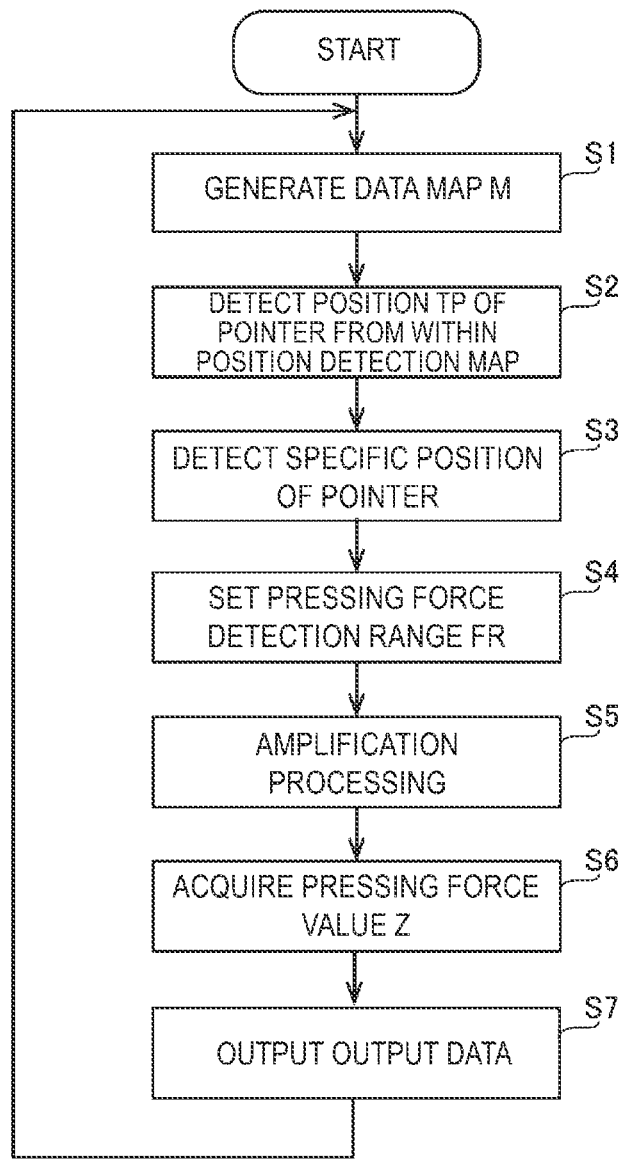
FIG. 11 is a diagram illustrating a flow of control processing of the touch panel system 100.

Next, a method for controlling the touch panel system 100 will be described with reference to FIG. 11. FIG. 11 is a diagram illustrating a flow of control processing of the touch panel system 100. The control processing of the touch panel system 100 described below is performed by the controller 2.

As illustrated in FIG. 11, in step S1, the data map M is generated. In other words, the position signal value G1 and the pressing force signal value G2 are acquired from the touch panel 1, and the data map M (see FIG. 7) is generated based on the position signal value G1 and the pressing force signal value G2.

In step S2, the position TP of the pointer is detected from within the position detection map TM. Subsequently, in step S3, a specific position of the pointer is calculated, and output data including information on the specific position of the pointer is transmitted to the display device 101.

In step S4, the pressing force detection range FR is set based on the position TP of the pointer. Subsequently, in step S5, the amplification processing of amplifying at least one value of the pressing force signal values G2 in the pressing force detection range FR is performed. Subsequently, in step S6, a total value of the pressing force signal values G2 in the pressing force detection range FR is acquired as the pressing force value Z. Then, in step S7, output data including the information on the position pressed by the pointer and information on the pressing force value Z is transmitted to the display device 101.

The method described above can improve detection sensitivity of a pressing force even when the cover member 50 is provided.

Figure 12:
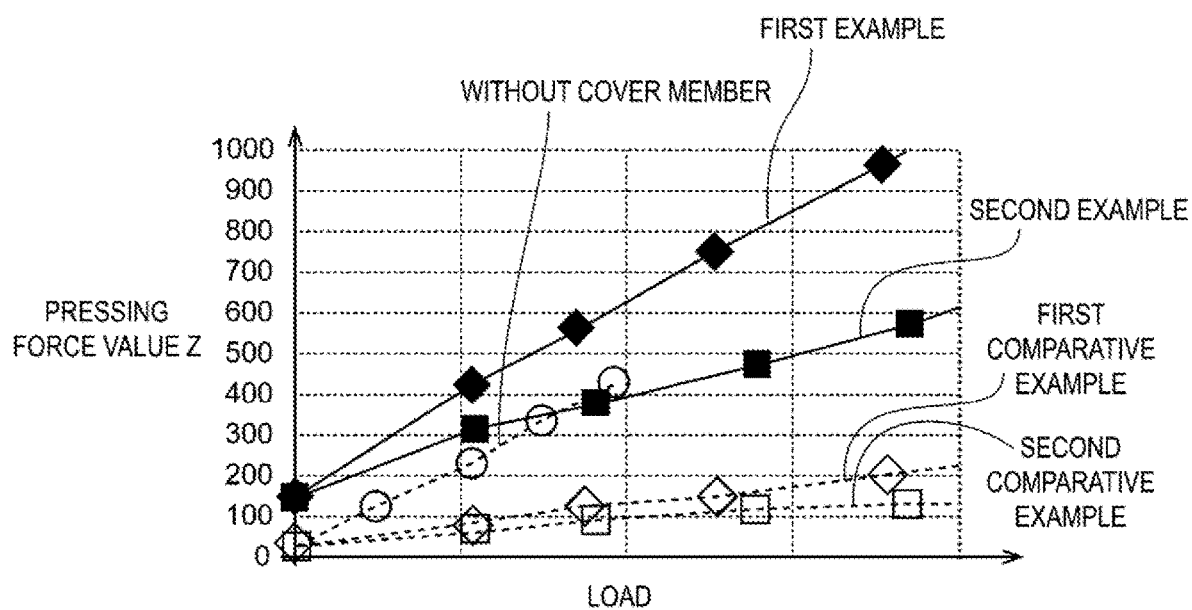
FIG. 12 is a diagram showing a comparison result between a first example and a second example of the touch panel system 100 according to the first embodiment, and a first comparative example and a second comparative example of a touch panel system.

Comparison Result between Example According to First Embodiment and Comparative Example Next, a comparison result between a first example and a second example of the touch panel system 100 according to the first embodiment, and a first comparative example and a second comparative example of a touch panel system will be described with reference to FIG. 12. FIG. 12 is a diagram showing the comparison result between the first example and the second example of the touch panel system 100 according to the first embodiment, and the first comparative example and the second comparative example of the touch panel system.

In the first example and the first comparative example, the touch panel 1 including the cover member (glass) 50 having a thickness of 0.4 mm was used. In the second example and the second comparative example, the cover member (glass in the example and comparative example) was used. The touch panel 1 including the cover member 50 having a thickness of 0.7 mm was used. The touch panel systems according to the first comparative example and the second comparative example were configured to output a value of the pressing force value Z without performing the amplification processing in step S5 illustrated in FIG. 11.

Then, the output pressing force value Z was measured while changing a load on the touch panel according to each of the first example, the second example, the first comparative example, and the second comparative example. Further, the value of the output pressing force value Z was measured without providing the cover member in the touch panel and performing the amplification processing in step S5 illustrated in FIG. 11, as a reference for comparison (hereinafter referred to as "an example without the cover member").

As shown in FIG. 12, an inclination of the pressing force value Z with respect to the load according to the first comparative example was a value equal to or less than one-fourth (a value approximately one-fifth) that of the pressing force value Z with respect to the load according to the example without the cover member. Further, an inclination of the pressing force value Z with respect to the load according to the second comparative example was a value equal to or less than one-ninth (a value approximately one-tenth) that of the pressing force value Z with respect to the load according to the example without the cover member. Note that a greater "inclination of the pressing force value Z with respect to the load" indicates greater detection sensitivity of a pressing force.

In contrast, as shown in FIG. 12, an inclination of the pressing force value Z with respect to the load according to the first example was a value equal to or greater than 1.1 times (a value approximately 1.2 times) that of the pressing force value Z with respect to the load according to the example without the cover member. Further, an inclination of the pressing force value Z with respect to the load according to the second example was a value equal to or greater than 0.8 times (a value approximately 0.9 times) that of the pressing force value Z with respect to the load according to the example without the cover member. As a result, in the first example and the second example, it was proved that detection sensitivity of a pressing force was improved even when the cover member (glass) 50 was provided.

Second Embodiment

Next, a configuration of a touch panel system 200 according to a second embodiment will be described with reference to FIGS. 13 and 14. Unlike the touch panel system 100 according to the first embodiment that amplifies only a maximum value among the pressing force signal values G2 in the pressing force detection range FR, the touch panel system 200 according to the second embodiment amplifies a maximum value and a second greatest value after the maximum value. Note that, in the following description, when the same reference numerals as those in the first embodiment are used, similar configurations to those in the first embodiment are described, and reference is made to the preceding description unless otherwise described.

Figure 13:
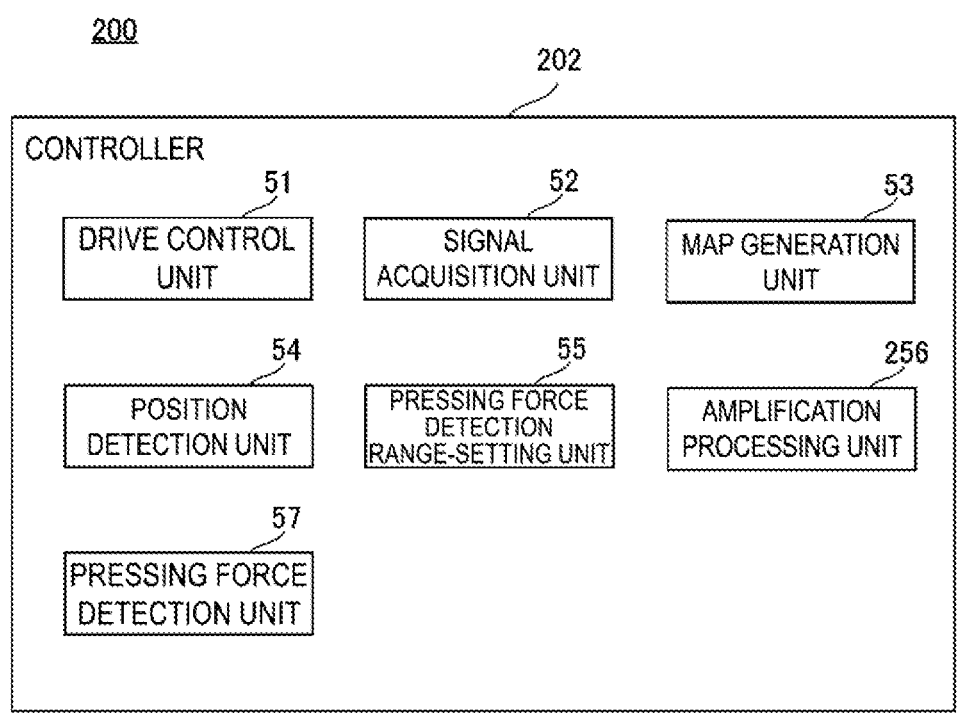
FIG. 13 is a functional block diagram of a controller 202 of a touch panel system 200 according to a second embodiment.

FIG. 13 is a functional block diagram of a controller 202 of the touch panel system 200 according to the second embodiment. An amplification processing unit 256 is provided in the controller 202.

Figure 14:
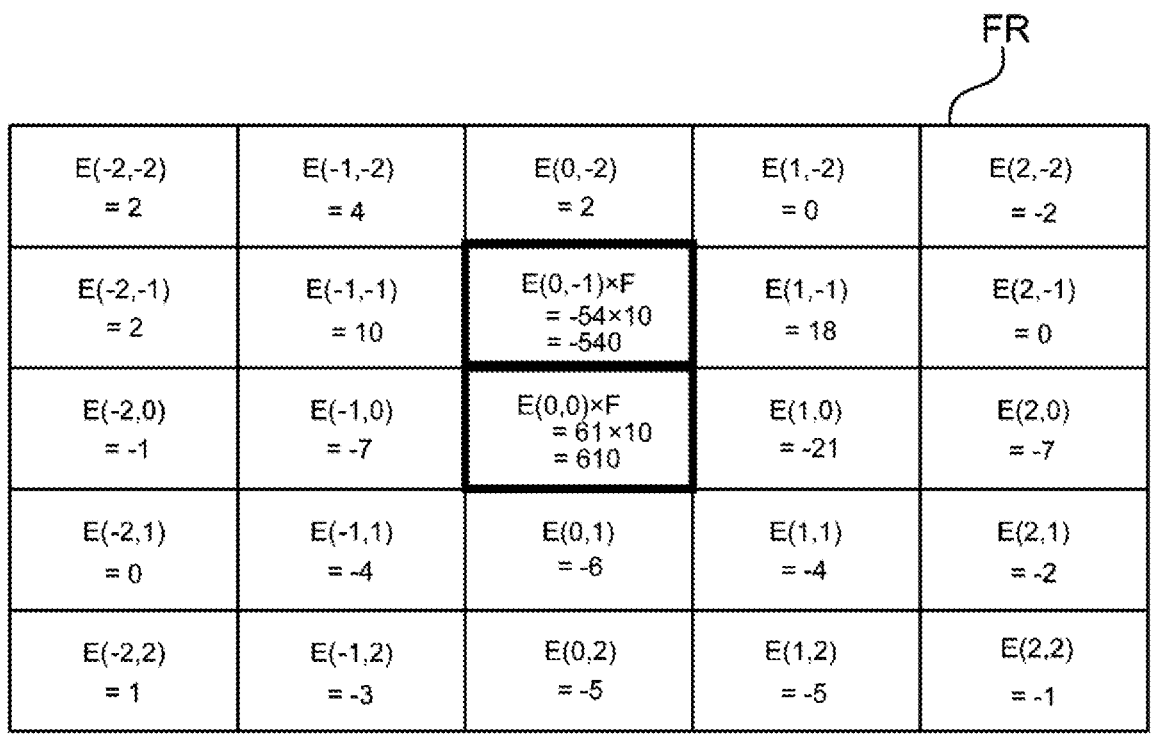
FIG. 14 is a diagram illustrating an example of a value of a pressing force detection map FM after amplification processing according to the second embodiment.

FIG. 14 is a diagram illustrating an example of a value of a pressing force detection map FM after amplification processing according to the second embodiment. In the second embodiment, the amplification processing unit 256 performs the amplification processing on a maximum value and a second greatest signal value after the maximum value among pressing force signal values G2 in the pressing force detection range FR. Note that a great signal value is a value having a great absolute value. In a case of the example illustrated in FIG. 14, E(0, 0) in the pressing force detection range FR is a maximum value "61", and E(0, −1) is a second greatest value "−54". The amplification processing unit 256 amplifies the maximum value "61" to "610", which is a value F-times (for example, 10-times) the maximum value, and amplifies the second greatest value "−54" to "−540", which is a value F-times (for example, 10-times) the second greatest value.

A pressing force detection unit 57 calculates a pressing force value Z indicating the magnitude of a pressing force generated by a pointer F, based on the pressing force signal value G2 in the pressing force detection range FR after the amplification processing. For example, the pressing force detection unit 57 calculates the pressing force value Z by summing absolute values of the pressing force signal values G2 in the pressing force detection range FR after the amplification processing. In a case of the example illustrated in FIG. 14, the pressing force value Z is 2+4+2+0+2+2+10+540+18+0+1+7+610+21+7+0+4+6+4+2+1+3+5+5+1=1257. Then, the pressing force detection unit 57 outputs the coordinates of a position FP and the pressing force value Z as output data. As a result, the pressing force value Z can be set to a greater value, and detection sensitivity of a pressing force can be further improved. Other configurations and effects are similar to the configurations and effects in the first embodiment.

Figure 15:
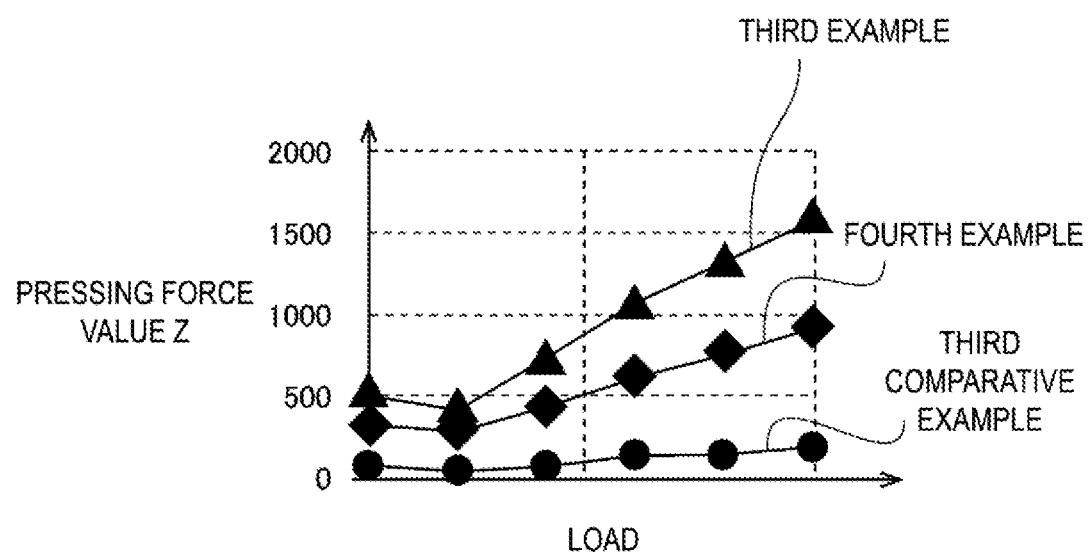
FIG. 15 is a diagram showing a comparison result between a third example of the touch panel system 200 according to the second embodiment, a fourth example of the touch panel system 100 according to the first embodiment, and a third comparative example of the touch panel system.

Comparison Result between Example According to Second Embodiment, Example According to First Embodiment, and Comparative Example Next, a comparison result between a third example of the touch panel system 200 according to the second embodiment, a fourth example of the touch panel system 100 according to the first embodiment, and a third comparative example of the touch panel system will be described with reference to FIG. 15. FIG. 15 is a diagram showing the comparison result between the third example of the touch panel system 200 according to the second embodiment, the fourth example of the touch panel system 100 according to the first embodiment, and the third comparative example of the touch panel system.

In each of the third example, the fourth example, and the third comparative example, the touch panel 1 including the cover member (glass) 50 having a thickness of 1.1 mm was used. The touch panel system according to the third comparative example was configured to output a value of the pressing force value Z without performing the amplification processing in step S5 illustrated in FIG. 11. The touch panel system 200 according to the third example amplified a maximum value and a second greatest signal after the maximum value among the pressing force signal values G2 in the pressing force detection range FR to output a value of the pressing force value Z. The touch panel system 100 according to the fourth example amplified only a maximum value among the pressing force signal values G2 in the pressing force detection range FR to output a value of the pressing force value Z.

As shown in FIG. 15, an inclination of the pressing force value Z with respect to a load according to the third comparative example was a value equal to or less than one-twenty-ninth (a value approximately one-thirtieth) that of the pressing force value Z with respect to a load according to the example without the cover member. In contrast, an inclination of the pressing force value Z with respect to a load according to the third example was a value equal to or greater than 0.8 times (a value approximately 0.9 times) that of the pressing force value Z with respect to the load according to the example without the cover member. Further, an inclination of the pressing force value Z with respect to a load according to the fourth example was a value equal to or greater than one-eighth (a value approximately one-seventh) that of the pressing force value Z with respect to the load according to the example without the cover member. As a result, in the configuration according to the second embodiment (third example), it was proved that detection sensitivity of a pressing force was improved even when the cover member 50 having a thickness of 1.1 mm was provided.

Third Embodiment

Next, a configuration of a touch panel system 300 according to a third embodiment will be described with reference to FIG. 16. Unlike the touch panel system 100 according to the first embodiment that amplifies only a maximum value among the pressing force signal values G2 in the pressing force detection range FR, the touch panel system 300 according to the third embodiment amplifies a maximum value (the greatest value), a second greatest value, . . . , and an N-th greatest value. Herein, N is a natural number equal to or greater than 3. Note that, in the following description, when the same reference numerals as those in the first or second embodiment are used, the same configurations as those in the first or second embodiment are described, and reference is made to the preceding description unless otherwise described.

Figure 16:
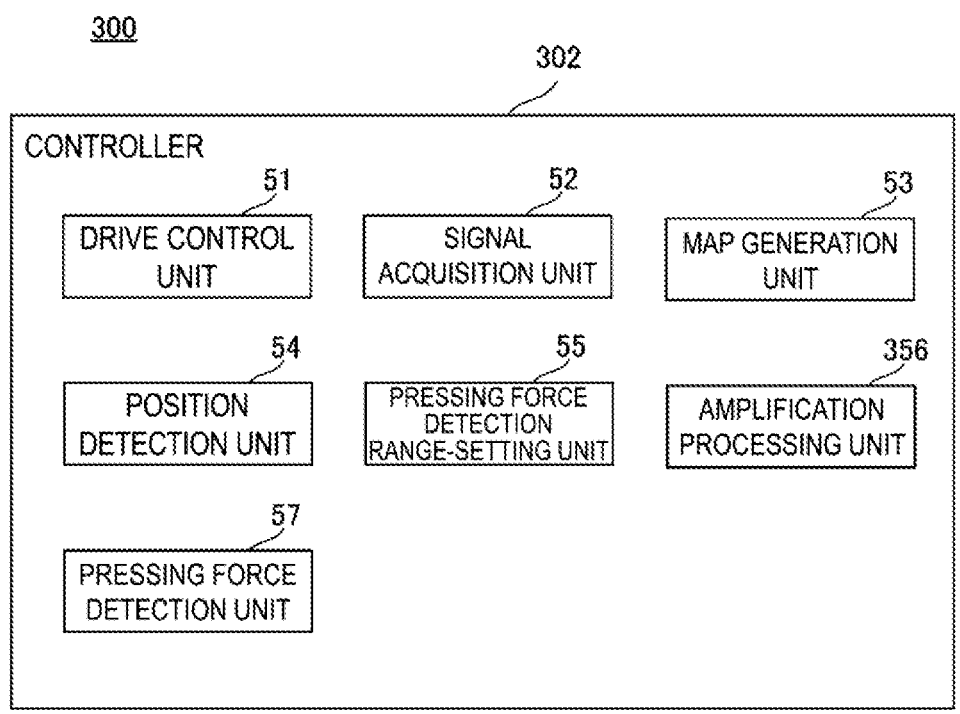
FIG. 16 is a functional block diagram of a controller 302 of a touch panel system 300 according to a third embodiment.

FIG. 16 is a functional block diagram of a controller 302 of the touch panel system 300 according to the third embodiment. An amplification processing unit 356 is provided in the controller 302. In the third embodiment, the amplification processing unit 356 performs amplification processing on a maximum value (the greatest value), . . . , and the N-th greatest value among the pressing force signal values G2 in a pressing force detection range FR. Here, N is a natural number equal to or greater than 3. Then, a pressing force detection unit 57 calculates a pressing force value Z indicating the magnitude of a pressing force generated by a pointer F, based on the pressing force signal value G2 in the pressing force detection range FR after the amplification processing. The pressing force detection unit 57 outputs coordinates of a position FP and the pressing force value Z as output data. As a result, the pressing force value Z can be set to a greater value, and detection sensitivity of a pressing force can be further improved. Other configurations and effects are similar to the configurations and effects in the first embodiment or the second embodiment.

Measurement Result of Example According to Third Embodiment

Next, a measurement result of the pressing force value Z of a fifth example to an eighth example of the touch panel system 300 according to the third embodiment will be described in comparison with the example without the cover member.

In the fifth example, the touch panel 1 including the cover member (glass) 50 having a thickness of 1.3 mm was used. In the sixth example, the touch panel 1 including the cover member (glass) 50 having a thickness of 1.5 mm was used. In the seventh example, the touch panel 1 including the cover member (glass) 50 having a thickness of 1.7 mm was used. In the eighth example, the touch panel 1 including the cover member (glass) 50 having a thickness of 2.0 mm was used. Then, in the fifth example to the eighth example, the amplification processing was performed on each of a maximum value (the greatest value), . . . , and an N-th greatest value among the pressing force signal values G2 in the pressing force detection range FR, and a total value of the pressing force signal values G2 in the pressing force detection range FR after the amplification processing was measured as the pressing force value Z.

As a result of the measurement, an inclination of the pressing force value Z with respect to a load according to the fifth example was equal to or greater than 0.9 times (approximately 1.0 times) that of the pressing force value Z with respect to the load according to the example without the cover member. An inclination of the pressing force value Z with respect to a load according to the sixth example was equal to or greater than 0.8 times (approximately 0.9 times) that of the pressing force value Z with respect to the load according to the example without the cover member. An inclination of the pressing force value Z with respect to a load according to the seventh example was equal to or greater than 0.7 times (approximately 0.8 times) that of the pressing force value Z with respect to the load according to the example without the cover member. An inclination of the pressing force value Z with respect to a load according to the eighth example was equal to or greater than 0.6 times (approximately 0.7 times) that of the pressing force value Z with respect to the load according to the example without the cover member. As described above, it was proved that detection sensitivity of a pressing force was improved even when the cover member 50 having a relatively great thickness (glass having a thickness of 1.3 mm or greater) as in the fifth example to the eighth example was provided.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

(1) An example is illustrated in which each of the electrodes in the first to third embodiments described above is formed in the rhombus shape, but the disclosure is not limited to this example. For example, each of the electrodes in the first to third embodiments may have a rectangular shape, a circular shape, an elliptical shape, or a polygonal shape.

(2) An example is illustrated in which the touch panel system according to the first to third embodiments described above is provided in the display device, but the disclosure is not limited to this example. A touch panel device without the display device may be formed.

(3) In the second and third embodiments described above, an example is illustrated in which the signal values as amplification targets are amplified by the same multiple, but the disclosure is not limited to this example. For example, a multiple by which a second greatest value after a maximum value is amplified may be set either smaller or greater than a multiple by which the maximum value is amplified.

(4) In each of the examples according to the first to third embodiments described above, an example of the thickness of the cover member is illustrated, but the disclosure is not limited to this example. The cover member having a thickness other than 0.4 mm, 0.7 mm, 1.1 mm, 1.3 mm, 1.5 mm, 1.7 mm, and 2.0 mm may be provided in the touch panel 1.

In addition, the touch panel system and the display device described above can be described as follows.

A touch panel system according to a first configuration includes a touch panel including a drive electrode, a position detection electrode, and a pressing force detection electrode; a cover member overlapping the touch panel; and a controller configured to provide a drive signal to the drive electrode and acquire a signal value from each of the position detection electrode and the pressing force detection electrode, wherein the controller includes a position detection unit configured to detect a position of a pointer, based on a signal value obtained from the position detection electrode, an amplification processing unit configured to perform amplification processing on at least one signal value in a pressing force detection range, the signal value corresponding to the position of the pointer detected by the position detection unit, among signal values obtained from the pressing force detection electrode, and a pressing force detection unit configured to calculate magnitude of a pressing force generated by the pointer, based on a signal value after the amplification processing being a signal value in the pressing force detection range including a signal value obtained by amplification by the amplification processing unit (first configuration).

According to the first configuration described above, even when the cover member is provided, at least one signal value in the pressing force detection range is amplified, and thus detection sensitivity of a pressing force can be improved.

In the first configuration, the amplification processing unit may be configured to perform the amplification processing on a maximum value among signal values in the pressing force detection range (second configuration).

According to the second configuration described above, a position having the maximum value is a position where the touch panel is highly likely to be pressed, and thus the position where the touch panel is pressed can be accurately detected by amplifying the signal value of the position.

In the second configuration, the amplification processing unit may be configured to perform the amplification processing on the maximum value and a second greatest signal value after the maximum value among signal values in the pressing force detection range (third configuration).

According to the third configuration described above, the second greatest signal value can also be amplified in addition to the signal value of the position having the maximum value, and thus a total value of the signal values in the pressing force detection range increases, and detection sensitivity of a pressing force can be further improved.

In the second or third configuration, the amplification processing unit may be configured to perform the amplification processing on each of each k-th greatest signal value in a range of 2≤k<N with k as a natural number in a case where N of an N-th greatest signal value among the signal values in the pressing force detection range is a natural number equal to or greater than 3, the maximum value, and the N-th greatest signal value (fourth configuration).

According to the fourth configuration described above, the signal value up to the N-th greatest signal value can also be amplified in addition to the signal value of the position having the maximum value, and thus a total value of the signal values in the pressing force detection range increases, and detection sensitivity of a pressing force can be further improved.

In any one of the first to fourth configurations, the controller may further include a map generation unit configured to generate a position detection map in a two-dimensional coordinate system formed of signal values obtained from the position detection electrode, and a pressing force detection map in a two-dimensional coordinate system formed of signal values obtained from the pressing force detection electrode, the position detection unit may be configured to detect a position of the pointer from within the position detection map, and the amplification processing unit may be configured to set the pressing force detection range including a position corresponding to the position of the pointer in the pressing force detection map and perform the amplification processing on at least one signal value in the pressing force detection range (fifth configuration).

According to the fifth configuration described above, the controller applicable to the touch panel system can be obtained by simply changing a design of a known controller that detects only a position of a pointer in the related art.

A display device according to a sixth configuration includes the touch panel system according to any one of the first to fifth configurations; and a display configured to display an image, wherein the touch panel is disposed in a position overlapping the display in a plan view (sixth configuration).

According to the sixth configuration described above, even when the cover member is provided, at least one signal value in the pressing force detection range is amplified, and thus a display device that has improved detection sensitivity of a pressing force can be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel system comprising:
a touch panel including a drive electrode, a position detection electrode, and a plurality of pressing force detection electrodes;
a cover member overlapping the touch panel; and
a control circuit configured to
provide a drive signal to the drive electrode,
acquire a first signal value from the position detection electrode,
acquire a plurality of second signal values from the plurality of pressing force detection electrodes,
detect a position of a pointer based on the first signal value,
perform amplification processing on at least one of the plurality of second signal values in a pressing force detection range, the pressing force detection range corresponding to the detected position of the pointer, and
calculate magnitude of a pressing force generated by the pointer based on the at least one of the plurality of second signal values after the amplification processing is performed.

2. The touch panel system according to claim 1, wherein the control circuit performs the amplification processing on a maximum value among the plurality of second signal values in the pressing force detection range.

3. The touch panel system according to claim 2, wherein the control circuit performs the amplification processing on the maximum value and a second greatest signal value, after the maximum value, among the plurality of second signal values in the pressing force detection range.

4. The touch panel system according to claim 2, wherein the control circuit performs the amplification processing on, among the plurality of second signal values in the pressing force detection range, each of (i) the maximum value, (ii) k-th greatest signal value in a range of 2≤k<N with k being a natural number and N being a natural number equal to or greater than 3, and (iii) an N-th greatest signal value.

5. The touch panel system according to claim 1, wherein the control circuit is further configured to
generate a position detection map in a two-dimensional coordinate system formed of the first signal value obtained from the position detection electrode, and a pressing force detection map in a two-dimensional coordinate system formed of the plurality of second signal values obtained from the plurality of pressing force detection electrodes,
detects the position of the pointer within the position detection map,
set the pressing force detection range including a position corresponding to the position of the pointer in the pressing force detection map, and
perform the amplification processing on at least one of the plurality of second signal values in the pressing force detection range.

6. A display device comprising:
the touch panel system according to claim 1; and
a display configured to display an image,
wherein the touch panel is disposed in a position overlapping the display in a plan view.

* * * * *